United States Patent [19]

Vukov et al.

[11] Patent Number: 5,068,277
[45] Date of Patent: Nov. 26, 1991

[54] HYDROLYZABLE SILICONE POLYMERS

[75] Inventors: Rastko Vukov, Toronto; Basil A. Behnam, Oakville, both of Canada

[73] Assignee: Rhone-Poulenc Inc., Princeton, N.J.

[21] Appl. No.: 346,869

[22] Filed: May 3, 1989

[51] Int. Cl.$^5$ .................................................. C08K 3/08
[52] U.S. Cl. .................................. 524/441; 427/387; 427/388.1; 427/389.7; 427/393.6; 264/331.11; 528/15; 528/31; 528/34; 525/478; 556/479; 106/287.11; 106/287.13; 106/287.14; 106/287.16
[58] Field of Search .................. 528/15, 31, 34; 525/478; 264/331.11; 556/479; 524/441; 427/387, 388.1, 393.6, 389.7; 106/287.11, 287.13, 287.14, 287.16

[56] References Cited

U.S. PATENT DOCUMENTS

| | | | |
|---|---|---|---|
| 3,402,192 | 7/1965 | Haluska | 260/448.2 |
| 4,331,555 | 5/1982 | Baskeut et al. | 252/351 |
| 4,342,796 | 8/1982 | Brown | 427/136 |
| 4,462,828 | 7/1984 | Otsuki | 524/763 |
| 4,476,282 | 10/1984 | Koerner et al. | 524/837 |
| 4,517,375 | 5/1985 | Schmidt | 556/463 |
| 4,525,213 | 6/1985 | Linn | 106/2 |
| 4,529,758 | 6/1985 | Traver | 524/43 |
| 4,616,076 | 10/1986 | Ona et al. | 528/15 |
| 4,648,904 | 3/1987 | Pasquale et al. | 106/2 |
| 4,780,260 | 10/1988 | Yoshida et al. | 528/15 |
| 4,849,491 | 7/1989 | Ogawa et al. | 525/478 |

FOREIGN PATENT DOCUMENTS 0396457  7/1990  European Pat. Off. .

OTHER PUBLICATIONS

G. P. Kovach, "Abherents", Kirk-Othmer Ency., of Chem. Tech., 2d ed., vol. 1, pp. 1–11 (1963).
TSCA Chemical Substance Inventory for Compound Containing a Di-Methyl and a Methyl 2-(Trimethoxysilyl)Ethyl Group of a Siloxane or a Silcone Control No. 52-880000323.

Primary Examiner—Melvyn I. Marquis
Attorney, Agent, or Firm—Morgan & Finnegan

[57] ABSTRACT

This invention relates to polyfunctional silicone polymers containing one or more alkylene polyfunctional hydrolyzable silyl radicals extended from the siloxy polymer chain, said polymer having the structure

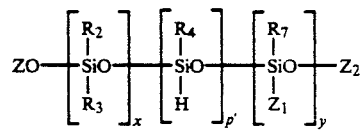

wherein $R_2$ and $R_3$ are each independently alkyl or aryl optionally substituted with lower alkyl;
$R_4$ is hydrogen or $R_2$;
$R_7$ is $R_2$ or $Z_1$;
$Z_1$ is —$CH_2CHA$—$(CH_2)_rSi(R_1)_3$;
Z and $Z_2$ are each independently —$CH_2CHA$—$(CH_2)_rSi(R_1)_3$ or $(R_9)_nSi(H)_{3-n}$;
$R_9$ is alkyl, alkoxy, phenoxy or aryl optionally substituted with lower alkyl;
n has a value of from 0 to 3;
x has a value of from 2 to 1000;
y has a value of from 1 to 200;
p' has a value of from 0 to about 50% of y;
A is hydrogen, alkyl or phenyl;
r has a value of from 0 to 12; and
$R_1$ is hydroxy, acyloxy, halogen, amino, alkoxy, aryloxy or aryloxy substituted with lower alkyl, halogen or acyloxy. The invention also relates to the use of said polymers as surface modifiers, reinforcing coatings and fillers for thermoplastics.

27 Claims, No Drawings

HYDROLYZABLE SILICONE POLYMERS

BACKGROUND OF THE INVENTION

Silicone polymers have long been known for their abrasion resistant properties and resistance to chemical attack, accordingly, these materials have been used to coat surfaces of various engineering-grade thermoplastics and other substrates exposed to a corrosive atmosphere or damage during handling. It has been found, however, that the adhesive properties of these coatings lack performance over extended periods of time.

Non-polymeric silane compounds have been employed as fillers to impart strength and flexibility in various plastics; however, large amounts of these silane materials must be incorporated in order to provide improved results. Further, the silanes have a tendency to migrate to the surface of the plastic material, causing scale out during such processing as injection molding or extrusion.

Accordingly, it is an object of the present invention to overcome the above discussed disadvantages while providing an economical silicone polymer which retains all of the beneficial properties of those previously known.

Another object of this invention is to provide a commercially feasible and economical method for the preparation of the present silicone containing polymers.

Still another object of this invention is to provide a silicone containing coating material chemically bonded at numerous sites to a substrate surface.

Another object is to provide reinforcing agents for thermoplastics and other materials.

These and other objects of the invention will become apparent from the following description and disclosure.

THE INVENTION

The essential features of the present polymers are (a) the presence of one or more alkylene polyfunctional hydrolyzable silyl radicals and (b) the availability of such radicals in spaced relationship from the polysiloxane polymer backbone. The above criticalities are realized in the polymer having the structure

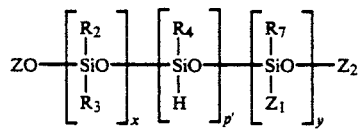

I.

wherein $R_2$ and $R_3$ are each independently alkyl or aryl optionally substituted with lower alkyl;
$R_4$ is hydrogen or $R_2$;
$Z_1$ is $-CH_2CHA-(CH_2)_rSi(R_1)_3$;
Z and $Z_2$ are each independently $(R_9)_nSi(H)_{3-n}$ or $-CH_2CHA-(CH_2)_rSi(R_1)_3$;
n has a value of from 0 to 3;
$R_9$ is alkyl, alkoxy, phenoxy or aryl optionally substituted with lower alkyl;
$R_7$ is $R_2$ or $Z_1$;
x has a value of from 2 to 1000;
y has a value of from 1 to 200;
p' has a value of from 0 to about 50% of y;
A is hydrogen, alkyl or phenyl;
r has a value of from 0 to 12 and
$R_1$ is hydroxy, acyloxy, halogen, amino, alkoxy, aryloxy or aryloxy substituted with lower alkyl, halogen or acyloxy.

Of the above polymers, those wherein p' represents not more than 1% of the polymer and up to 99% of the hydrogen atoms bonded to silicone are converted to $-CH_2CH_2-(CH_2)_rSi(R_1)_3$ groups, $R_2$, $R_3$, $R_4$ and $R_7$ are each alkyl having 1 or 2 carbon atoms or phenyl, Z and $Z_2$ are $(alkyl)_nSi(H)_{3-n}$ where n is 2 or 3, r has a value of from 0 to 2, and x has a value of from 20 to 200 and y has a value of from 1 to 15. Most preferred are the polymers wherein p' has a value of 0, Z and $Z_2$ are $(alkyl)_3Si-$, r is 0 and $R_1$ is alkoxy having from 1 to 3 carbon atoms or hydroxy; of which the following compound is illustrative

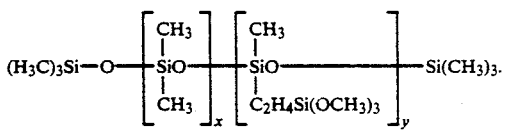

It will be understood that any of the organooxy or acyloxy $R_1$ groups can be hydrolyzed to hydroxy groups in the presence of water or steam.

The polymers of this invention are readily prepared by reacting a hydrogen containing silane, silicone or siloxy compound with an aliphatically unsaturated silane under relatively mild conditions. The reaction can be expressed by the following general equation

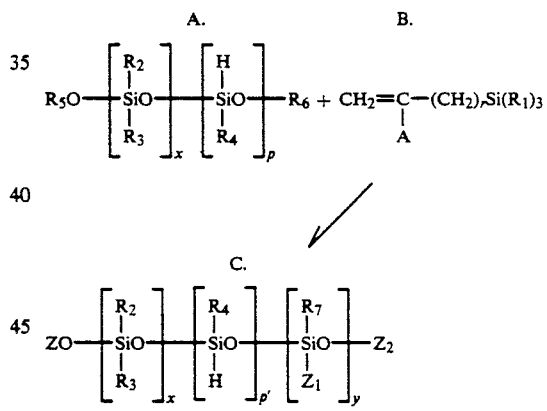

wherein $R_5$ and $R_6$ are each independently $(R_9)_nSi(H)_{3-n}$ where n has a value of from 0 to 3 and p has a value of from 1 to 200; Z, $Z_1$, $Z_2$, $R_1$, $R_2$, $R_3$, $R_4$, $R_7$, $R_9$, A, x, y, p' and r being defined in formula I.

Methods for the preparation of reactant (A) are well known in the published art and all such methods can be suitably employed as the reactant starting materials for the preparation of the present polymers. One representative method is described in Example 5 of U.S. Pat. No. 4,331,555, incorporated herein by reference. Similarly, the olefinically unsaturated silane coreactant (B) is also known as are methods for its preparation such as for example the general method described in SILICON REAGENTS IN ORGANIC SYNTHESIS by E. W. Colvin, Academic Press, 1988, also incorporated herein by reference.

The foregoing reaction wherein the reactive silanichydrogen, i.e. $-Si-H$, units of a silane or silicone compound or the reactive hydrogen-siloxy, i.e.

—O—Si—H, units of the polysiloxane reactant (A) are added across the

(double bonds) of the vinyl silane coreactant (B), is carried out at a temperature of between about 25° C. and about 160° C., preferably between about 80° C. and about 120° C. under a pressure of from about 0 psig to about 50 psig for a period of from about 1 to 8 hours. The reaction is effected in the presence of a small amount of an acidic platinum group metal catalyst, e.g. between about 15 and about 5,000 parts per million, preferably between about 20 and about 200 parts per million, based on the total reactants. Suitable catalysts include hexachloro platinic acid and others defined by the formulae $H_2PtCl_6$, $H_2PtCl_4$, $NaHPtCl_6$, $NaHPtCl_4$, $KHPtCl_6$, $KHPtCl_4$, $Na_2PtCl_4$, $K_2PtCl_4$, the corresponding bromides and iodides of these platinum compounds as well as the palladium, rhodium, ruthenium and rhenium counterparts of the above platinum halide compounds and corresponding acids or mixtures of said catalysts such as for example a mixture of hexachlorplatinic acid and hexachloropalladinic acid. The mole ratio of vinyl silane coreactant with respect to the number of hydrogen atoms in reactant (A) can vary between about 0.75:1 and about 15:1, depending upon the degree of dehydrogenation desired. Preferably ratios ranging between about 1:1 and about 10:1 and most preferably between about 2:1 and about 5:1 are useful in obtaining a product having at least one $Z_1$ unit per 12,000 molecular weight of polymer.

Also, the reaction is beneficially effected in the presence of an inert solvent such as benzene, toluene, xylene, dimethyl formamide, etc. in which the reactants can be diluted to between about 5 and about 100%. More often dilution to 10–20% is employed to prevent gelling and to optimize the operation; although, in the case of certain low molecular weight reactants, solvent can be omitted.

The hydrolyzable proct of the above reaction, having a molecular weight of between about 400 and about 400,000, preferably between about 4,000 and about 20,000, can be employed in an undiluted state or emulsified in water or diluted in an inert organic solvent, can be used directly as a chemical intermediate, as a polishing agent for hard surfaces such as glass, ceramic, metal and painted or varnished surfaces, as a filler for pulp and paper, cement, textiles etc. and as a reinforcing agent for polymers such as nylon, polybutyleneterephthalate and plastics.

The polyfunctional groups of the present polymers undergo rapid hydrolysis in the presence of aqueous solutions or on exposure to atmospheric humidity, thus converting the functional moieties to hydroxy groups. Where positive steps are taken to induce the hydrolysis of at least some of the $R_1$ substituents, the process can be carried out at a temperature of from about 20° C. to about 100° C. in the presence of steam or water. In this modified form the present products are useful as protective coatings or surface modifying agents for textile or plastic substrates containing hydroxy, carboxyl, amino, amido, alkoxy, aryloxy or other groups which are condensible with the silanol groups. These substrates form a covalent hydrogen bond with the silanol moiety, which upon dehydration forms a strong chemical bond between the substrate surface and the present polymer, thus providing an interpenetrating network coating on and between the substrate molecules or fibers. Further this chemical adhesion allows stress on the composite to be transferred to the plurality of clustered bonded sites resulting in reinforcement of the substrate material. The present thermally stable polymers, which can be employed neat or as an emulsion or solution are suitably coated on the substrate as a monolayer or multilayers to provide a strong chemical moisture and chemical resistant barrier. Also, between about 0.1% and about 2.0% of the polymer can be intimately mixed with a thermoplastic, cement, fiberglass or other synthetic material to provide reinforcing filler.

The particular bonding properties and the repeating clusters of dehydrated groups greatly increase the value of the present polymers as corrosion and water resistant coatings for hard surfaces such as roofing granules, glass, thermoplastics, metals, cement, etc.

The lower molecular weight species of the present polymer, such as those having a molecular weight between about 400 and about 5,000, particularly those containing one $Z_1$ group/3 x +y units, are ideally suitable as fillers and reinforcing agents for thermoplastic materials, e.g. nylon 6, polybutyleneterephthalate and others, particularly structural plastics.

The present polymers, characterized by their repeating clusters of polyfunctional groups and the non-sterically hindered position of these functional groups extended away from the polymer backbone, makes them excellent candidates for use in mineral-filled plastics. It will be appreciated that the present ambifunctional molecules possess the unique ability to improve the bond between organic polymers and silicons surfaces at alkoxysilyl groups or other hydrolyzable groups of the present polymers.

The polymers of this invention are also useful as water repellants, softening agents, mold release agents and polishing agents for various substrates, including any of those mentioned above as well as wood surfaces, rain wear, fiberglass and many others.

As a mold release agent the polymers of this invention are beneficially blended or reacted with a surfactant such as a mixture of 1,4-benzenedicarboxylic acid polymerized with 1,2-ethanediol and α-hydro-w-hydroxypoly(oxy-1,2-ethanediyl) known as BASE-C, a non-hydrolyzable silicone surfactant such as SILWET L-7605, a high molecular form of BASE-C known as ALKASPERSE 248C or a lower molecular weight of polyacrylic acid sodium salt, known as ALKASPERSE 149D, etc.

The present compounds are particularly valuable abherents which can be applied to a substrate as a solution by spraying, dipping, or brushing the surface to provide films which can withstand extremely high temperatures, e.g. up to about 400° F. as required in baking pans used for comestible products. Paint and printing ink formulations incorporating the present molecules with powdered aluminum pigment and beneficially a thixotropic agents, such as lithium octoate or fumed silica can retain heat resistance up to 500° F. Because of the high thermal stability, the present polymers are also very useful in the casting, forming or molding of thermoplastics. Water emulsions of the present polymers, e.g. 10% to 40% active, impart excellent water repellency to all types of surfaces, particularly cementitious surfaces of concrete, brick, mortar, stucco and stone. Many other uses will become apparent from the properties of the products herein defined.

The following are some representative of formulations in which the present products can be used.

| Components | Wt. % |
|---|---|
| Water Repellent Formulation | |
| Polyfunctional Silicone Polymer of MW 6,000–10,000 | 20.0 |
| Fatty acid glyceride sorbitan fatty acid ester surfactant | 3.0 |
| Acetic acid | 0.5 |
| Water | 76.5 |
| Mold Release Formulation | |
| Polyfunctional Silicone Polymer MW 10,000–15,000 | 35 |
| Na salt of nonylphenol polyethyleneoxide tosylate | 1 |
| Castor Oil | 0.25 |
| Dodecylbenzene sulfonic acid | 0.5 |
| Water | 63.25 |
| Anti-Corrosion Formulation | |
| Polyfunctional Silicone Polymer MW 15,000–20,000 | 15.00 |
| PEG | 2.00 |
| Water | 83.00 |
| Synthetic Fiber Filler & Reinforcing Composition | |
| Polyfunctional Silicone Polymer MW 800–2,000 | 40.00 |
| Nonylphenol polyethylene glycol | 0.5 |
| Water | 59.5 |

In treatments for other functions, e.g. defoaming, polishing, etc. the present polyfunctional silicone polymers can be applied neat or as an aqueous emulsion or solution in mineral spirits or other suitable aforementioned solvents containing from 10% to 60% polymer.

Having thus described the invention reference is now had to the following examples which set forth preferred embodiments but which are not to be construed as limiting to the scope of the invention as more broadly described above and in the appended claims.

EXAMPLE 1

Into a 2 liter, 3-neck, round bottom flask equipped with a mechanical stirrer, water condenser, thermometer and nitrogen inlet was charged 1337.7 grams of a hydrosiloxane having the formula

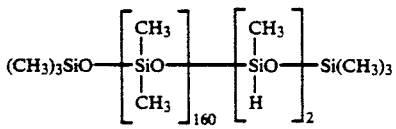

(containing 0.0165% H and having a viscosity of 285 Cst at 25° C.) and 343.4 grams of xylene. The resulting solution was heated to 85° C. with constant stirring and 70 ppm of hexachloroplatinic acid in 1,2-dimethoxyethane was added to the reaction flask, after which 35.9 grams of vinyl trimethoxy silane was added dropwise over a period of ½ hour, during which the reaction exothermed to 100° C.

After the reaction was complete, the mixture was cooled to 80–90° C. and then neutralized and decolorized with 13.7 grams of granular, 160 mesh, weakly basic anionic exchange resin, i.e. Amberlyst A-21 having a moisture content of less than 5%, an anionic exchange capacity of 1.25 meq/ml and a free dimethylamino functionality bonded to the styrene-divinylbenzene matrix. The mixture was maintained at 80–90° C. under agitation for 15 hours and was then rapidly filtered and stripped of solvent at 100° C. under reduced pressure. The product of this reaction was recovered as a viscous liquid having the formula

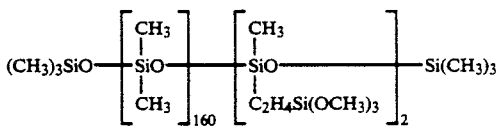

This product was found to have the following properties: Appearance : clear viscous liquid, Gardner Colour : <1m viscosity at 25° C. :400 Cst, specific gravity at 25° C. :0.958 g/ml, % solids :95.6%.

EXAMPLE 2

The procedure outlined in Example 1 was repeated except for the substitution of a hydrosiloxane having the formula

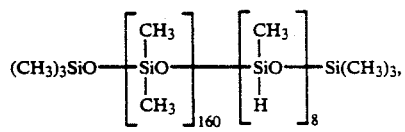

a H content of 0.064% and a viscosity of 325 Cst at 25° C. This polymer was reacted with 139.6 grams of vinyl trimethoxysilane and 170 ppm of chloroplatinic acid solution as described above. The product of this reaction, having the formula

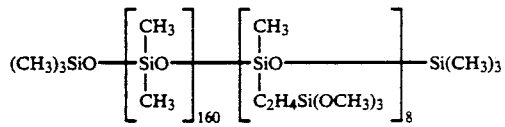

was found to have the following properties: Appearance : clear viscous liquid, Gardner Colour : <1, viscosity at 25° C. :810 Cst, specific gravity at 25° C. :0.974 g/ml, % solids :96.1%.

EXAMPLE 3

The procedure outlined in Example 1 was repeated except that the hydrosiloxane fluid was reacted with 56.4 grams of vinyl triacetoxysilane. The product of this reaction of the formula

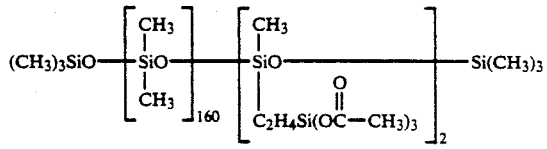

was found to have the following properties : Appearance : clear viscous liquid, Gardner Colour : <1, viscosity at 25° C. :385 Cst, specific gravity at 25° C. :0.960 g/ml, % solids :97.2%.

EXAMPLE 4

The procedure outlined in Example 1 was repeated with the substitution of a hydrosiloxane fluid having the formula

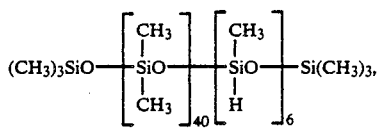

a H content of 0.172% and a viscosity of 46.5 Cst at 25° C. This polymer was reacted with 706.7 grams of vinyltriphenoxysilane and 200 ppm of chloroplatinic acid solution. The product of this reaction, having the formula

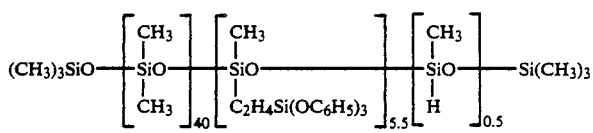

was found to have the following properties: Appearance : clear viscous liquid, Gardner Colour : <1, viscosity at 25° C. :395 Cst, specific gravity at 25° C. :1.05 g/ml, % solids :98.2%.

EXAMPLE 5

The procedure outlined in Example 4 was repeated except for the substitution of 300.0 grams of a hydrosiloxane fluid having the formula

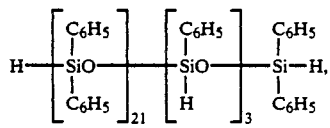

a H content of 0.106% and a viscosity of 22.0 Cst at 25° C. This polymer was reacted with 106.6 grams of vinyltriphenoxy silane and 120 ppm of chloroplatinic acid solution in the presence of 80 grams of xylene.

After the reaction was complete, the mixture was neutralized and decolorized with 4.0 grams of Amberlyst A-21. The mixture was then filtered and stripped of solvent at 100° C. and reduced pressure. The product of this reaction, having the formula

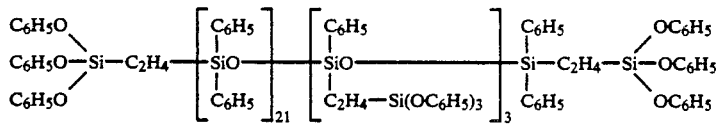

was found to have the following properties : Appearance : clear viscous liquid, Gardner Colour : <1, viscosity at 25° C. :68 Cst, specific gravity at 25° C. :1.06, % solids :97.8%.

The above polyfunctional products of this invention can be hydrolyzed at elevated temperature, e.g. 80° C. and above, in the presence of acid or base and moisture, optionally in the additional presence of a hydroxylated compound.

What is claimed is:

1. A hydrolyzable silicon containing polymer having the formula

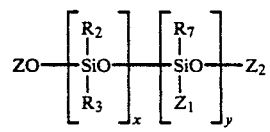

wherein $R_2$ and $R_3$ are each independently alkyl or aryl optionally substituted with lower alkyl;
$Z_1$ is $-CH_2CHA-(CH_2)_rSi(R_1)_3$;
Z and $Z_2$ are each independently $(R_9)_nSi(H)_{3-n}$;
n has a value of from 0 to 3;
$R_9$ is slkyl, alkoxy, phenoxy, or aryl optionally substituted with lower alkyl;
$R_7$ is $R_2$;

x has a value of from 2 to 1000;
y has a value of from 1 to 200;
A is hydrogen, alkyl or phenyl;
r has a value of from 0 to 12; and
$R_1$ is hydroxy, acyloxy, halogen, amino, alkoxy, aryloxy or aryloxy substituted with lower alkyl, halogen or acyloxy.

2. The polymer of claim 1 wherein A is alkyl or phenyl.

3. The polymer of claim 1 wherein $R_2$, $R_3$ and $R_7$ are each $C_1$ to $C_2$ alkyl or phenyl.

4. The polymer of claim 1 wherein Z and $Z_2$ are each $(alkyl)_3Si-$ and the A member of $Z_1$ is hydrogen.

5. The polymer of claim 4 having the formula

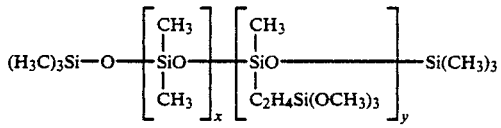

6. The polymer of claim 1 wherein $R_1$ is hydroxy.

7. The polymer of claim 6 wherein Z and $Z_2$ are each $(alkyl)_3Si-$.

8. The polymer of claim 7 having the formula

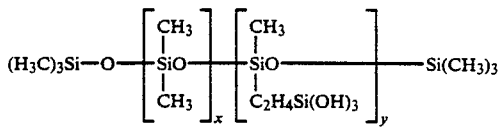

9. The polymer of claim 1 wherein $R_2$, $R_3$ and $R_7$ are $C_1$ to $C_2$ alkyl or phenyl, x has a value of from 20 to 200 and y has a value of from 1 to 15, $R_2$ is alkyl, n has a value of 2 or 3, and wherein A is hydrogen and r has a value of from 0 to 2.

10. A process of applying an effective coating amount of the polymer of claim 1 to the surface of a substrate.

11. A process of mixing an effective reinforcing amount of the polymer of claim 1 with a natural or synthetic material.

12. A process of contacting a mold with a mold releasing amount of the compound of claim 1.

13. A process of incorporating an effective surface polishing amount of the compound of claim 1 in a polish formulation.

14. A product of the process of claim 10.

15. A product of the process of claim 11.

16. A product made by a comprising the steps of:
contacting a mold with a mold releasing amount of the compound of claim 1; and
molding thermoplastic material in the mold to make the product.

17. A product of the process of claim 13.

18. the polmymer of claim 1 wherein n is 3.

19. The polymer of claim 18 wherein $R_9$ is alkyl, phenoxy, or aryl optionally substituted with lower alkyl.

20. The polymer of claim 18 wherein $R_1$ is hydroxy, acyloxy, halogen, amino, aryloxy or aryloxy substituted with lower alkyl, halogen or acyloxy.

21. The process of claim 10 wherein the substrate is selected from textile, wherein the coating chemically bonds to the substrate.

22. The process of claim 10 wherein the substrate is selected from roofing granules, glass, metal or a cementitious surface.

23. The process of claim 11 wherein the material is selected from a thermoplastic, cement or fiberglass and the polymer has a molecular weight between about 400 and about 5000.

24. The process of incorporating an effective surface polishing amount of the compound of claim 8 in a polish formulation.

25. A composition comprising an effective mold release amount of the polymer of claim 1 and a surfactant.

26. A paint or printing ink composition comprising an effective abherent amount of the polymer of claim 1, powdered aluminum pigment, and a thixotropic agent.

27. The process of claim 10 wherein the substrate is selected from plastic, wherein the coating chemically bonds to the substrate.

* * * * *